March 7, 1961 — C. A. ROSEN — 2,974,296
ELECTROMECHANICAL TRANSDUCER
Original Filed June 29, 1954 — 3 Sheets-Sheet 1

INVENTOR:
CHARLES A. ROSEN,
BY
HIS ATTORNEY.

March 7, 1961  C. A. ROSEN  2,974,296
ELECTROMECHANICAL TRANSDUCER
Original Filed June 29, 1954  3 Sheets-Sheet 2

INVENTOR:
CHARLES A. ROSEN,
BY *George V. Eltgroth*
HIS ATTORNEY.

March 7, 1961  C. A. ROSEN  2,974,296
ELECTROMECHANICAL TRANSDUCER
Original Filed June 29, 1954  3 Sheets-Sheet 3

INVENTOR:
CHARLES A. ROSEN,
BY George V Ettgroth
HIS ATTORNEY.

United States Patent Office 2,974,296
Patented Mar. 7, 1961

2,974,296

ELECTROMECHANICAL TRANSDUCER

Charles A. Rosen, Menlo Park, Calif., assignor to General Electric Company, a corporation of New York Continuation of application Ser. No. 524,221, July 25, 1955, which is a division of application Ser. No. 439,992, June 29, 1954, now Patent No. 2,830,274, dated Apr. 8, 1958. This application May 26, 1959, Ser. No. 816,010

19 Claims. (Cl. 333—72)

The present invention relates to electromechanical transducers for alternating current waves and has as an object thereof to provide a piezo-electric transformer. The present application is a continuation of U.S. application, Serial No. 524,221, filed July 25, 1955, which is a division of U.S. Patent 2,830,274, granted April 8, 1958, based upon application, Serial No. 439,992, filed June 29, 1954. The present application treats further refinements in certain transducers first disclosed in application Serial Number 401,812, now abandoned, entitled "Electromechanical Transducer," filed January 4, 1954, in the name of Charles A. Rosen and Keith A. Fish, which transducers are the subject matter of a divisional application Serial Number 486,853, now abandoned, filed February 8, 1955, Charles A. Rosen, said divisional application being a division of application Serial Number 401,812.

The term piezo-electric transformer is here applied to a passive electrical energy transfer device or transducer employing the piezo-electric properties of a material to achieve a transformation of voltage or current or impedance. In structure, a piezo-electric transformer includes a body of piezo-electric material, having electrodes applied to the body for the removal of the potentials developed in the body upon the application of input potentials.

The piezo-electric transformer herein treated is of wide application in electrical circuits, providing both advantageous selectivity and large transformation ratios. The piezo-electric transformer may consequently be employed in band pass circuits, in high voltage supplies in which an alternating current voltage is transformed to a high value and subsequently rectified, and in many other applications.

The operation of a piezo-electric transformer may be characterized as a two or three step process involving an initial piezo-electric conversion of electrical energy into mechanical energy followed by a reconversion of the mechanical energy back into electrical energy. It is also possible to consider the transfer of mechanical energy from a first region of the piezo-electric body cooperating with the input electrodes of the transformer to a second region of the piezo-electric body cooperating with the output electrodes of the transformer as a third and intermediate step in the process of operation. This latter view appears to be more susceptible of mathematical treatment and to correspond more closely with observed results in certain transformer configurations.

The mechanical energy referred to is in the form of vibrational energy which corresponds to certain resonant modes of vibration of the piezo-electric body. Utilization of a resonant piezo-electric body enhances the transformation ratios and the efficiency of transformation. In utilizing a resonant piezo-electric workpiece, the invention applies certain well established principles of piezoelectricity. An introduction into such matters may be had in an article appearing in the Proceedings of the Institute of Radio Engineers of 1930, volume 18, pages 862 through 893, by Y. Watanabe, entitled, "Piezo-Electric Resonators in High Frequency Oscillation Circuits." Certain early piezo-electric "couplers" employing resonant piezo-electric bodies are described in "Piezo-electricity" by W. G. Cady, section 500, pages 667 to 669. Such piezo-electric devices were characterized by high-selectivity and transformation ratios which, in the ideal case, could be no higher than unity as losses were minimized.

Accordingly, it is an object of the present invention to provide a piezo-electric transformer.

It is another object of the present invention to provide a piezo-electric transformer which is capable of substantial transformation ratios.

It is a further object of the present invention to provide a piezo-electric transformer which may be easily and inexpensively produced.

The invention is of general application, and may be used in a number of advantageous embodiments. It is still another object of the present invention to provide an improved piezo-electric transformer filtering device.

It is a further object of the present invention to provide a piezo-electric transformer of substantial voltage amplification and high voltage capabilities for the production of high voltages.

These and other objects are achieved in a novel energy transfer device employing a piezo-electric body having a resonant mode at a predetermined frequency by the advantageous placement of input and output electrodes upon the piezo-electric body. In accordance with the present invention, advantage is taken of the fact that excitation of a desired mode of vibration may be accomplished by electrodes energized by periodic voltages corresponding to the frequency of the desired mode and, subject only to the restriction of the rules developed herein, that a relatively large amount of freedom may be exercised in the placement of these electrodes, while still continuing the excitation of the aforementioned mode, the effect of varying electrode placements being to change the amplitude of vibration of the fundamental mode that a given applied voltage will occasion. The mode of vibration or periodic stress pattern, induced in the piezo-electric body, by virtue of the reverse piezoelectric properties of the material, is accompanied by a periodic electric field pattern having an intensity proportional to the strain pattern. Any portion of the field may then be coupled to output electrodes for the development of an output voltage whose magnitude is dependent on the integral of the portion of the field coupled.

Accordingly, the present invention teaches that by the advantageous placement of input and output electrodes upon the piezo-electric body of the transformer, an electrical transformation may be accomplished.

Further advantages are achieved by the use of certain ferro-electric materials which may be readily polarized in whole or in part in a number of orientations, subsequent to shaping of the piezo-electric member, thereby permitting the most effective configurations to be easily carried out.

Additional advantages may be achieved by certain configurations which give high voltage transformation ratios. Such an advantageous configuration is that in which a long thin piezo-electric member is provided with two regions of polarization; a first region wherein the plane of polarization is parallel to the thin dimension and a second region in which the plane of polarization is parallel to the large dimension.

The features of the invention desired to be protected are pointed out in the appended claims. The invention itself together with its further objects and advantages will be best understood by reference to the following specification when taken in connection with the appended drawings in which:

Figure 1:
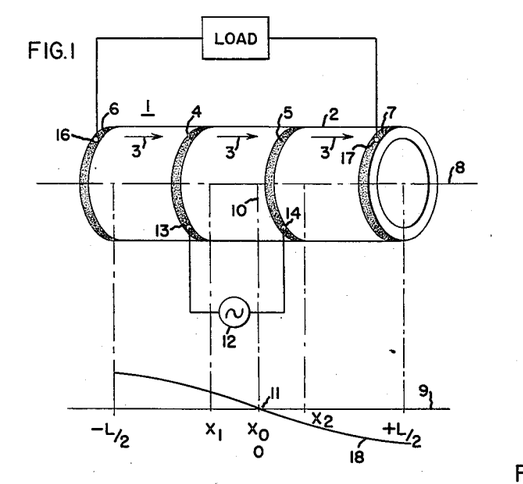
Fig. 1 illustrates a piezo-electric transformer embodying the invention having a tubular piezo-electric body of continuous polarization. A graph is included in Fig. 1 to illustrate the mode of vibration of this piezo-electric transformer.

Referring now to Fig. 1, there is shown a first embodiment of the present invention. At 1 is shown a piezo-electric transformer comprising a body 2 of elongated tubular construction having relatively thin walls. The body 2 is of ferro-electric material, such as barium titanate. The body 2 is polarized longitudinally in a direction generally indicated by the arrows 3. Electrodes for the transformer 1 are shown at 4, 5, 6 and 7. These electrodes consist of a narrow band of conductive material coated upon the outer surface of the body 2 in a plane perpendicular to the longitudinal axis of the body 2 and completely encircling it. For convenience in describing the position of the electrode 4, 5, 6, and 7, with respect to the longitudinal axis 8, of the body 2, the positioning of these electrodes is projected perpendicularly upon a line 9 which we shall term the X axis. The longitudinal and geometrical center 10 of the body 2 is then projected upon the line 9 at the point 11 which is assigned an X coordinate value of zero. The electrodes 4 and 5 take respectively positions represented upon the line 9 by $X_1$ and $X_2$ while the electrodes 6 and 7, which are placed at the ends of the body, take respectively the positions $$-\frac{L}{2} \text{ and } \frac{L}{2}$$

L representing the length of the body 2. Preferably, the electrodes 4 and 5 are each placed at equal distances from the center 10 and are separated in the preferred embodiment by a distance of approximately one third of the length. A source 12 of alternating current potentials is shown, having its terminals connected to the inner electrodes 4 and 5 at the junctions 13 and 14. The connecting wires from the source 12 should be relatively fine and flexible, and the junctions 13 and 14 may be small drops of solder deposited on the surface of the electrodes 4 and 5 respectively, by which the fine connecting wires may be secured. An electrical load device 15 is shown having connections coupled respectively to the electrodes 6 and 7 at the junctions 16 and 17. The wires coupling the load 15 and the junctions 16 and 17 should be of similar construction to the wires and junctions by which the source 12 is coupled.

Figure 5:
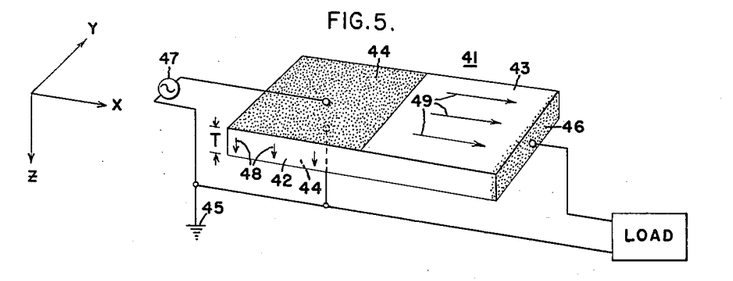
Fig. 5 illustrates another piezo-electric transformer according to the invention, in which a thin rectangular piezo-electric body is employed having at one side thereof a transversely polarized region.

The longitudinal dimensions of the body 2 and the positioning of the electrodes 4, 5, 6 and 7 are determinative respectively of the frequency of operation of the transformer and the transformation ratio of the transformer. In the configuration shown, the electrodes 4 and 5 are oriented to excite the body 2 in a generally longitudinal pattern. The manner of achieving excitation will be treated subsequently. In exciting the body 2 in a longitudinal mode, a natural mode of vibration for the body 2 is with antinodes occurring at either end since both ends are unconstrained and a nodal region occurring at the mid-sections. These boundary conditions restrict the frequencies of vibration of the body in a longitudinal mode to a limited number of frequencies which can be calculated when the longitudinal elastic properties and density of the body 2 are known. These frequencies of vibration are said to be harmonically related to the one fundamental frequency when the length is large relative to the other dimensions. In the present embodiment, vibrations in the fundamental mode is illustrated, and the frequency at which this mode occurs may be calculated in the manner discussed in connection with Fig. 5. A graph of the longitudinal particle displacement plotted against the position of the particle along the X axis is shown by the line 18, the line 18 indicating the displacements at the instant in time that maximum extension occurs while the device is operating in the fundamental mode. As may be observed, the ordinate attains maximum values at an X coordinate of $$-\frac{L}{2} \text{ and } +\frac{L}{2}$$

the positions taken respectively by electrodes 6 and 7, and a minimum at a zero X coordinate, the position of the center 10. It should be noted that the electrodes 4 and 5 are placed at X coordinates having elongations of intermediate values and of equal magnitude. If one assumes free resonance in the fundamental mode in a material having perfect elastic properties, the curve 16 is sinusoidal to either side of the zero X coordinate.

The operation of the piezo-electric transformer may now be considered under the influence of applied potentials having a frequency equal to the frequency of vibration of the body 2 in the fundamental mode just described, and serving to supply energy to the device 10 which is assumed to be of relatively high impedance. The source 12 applies a potential between the electrodes 4 and 5 which creates an electric field gradient between these electrodes. A property of a piezo-electric material is that upon application of an electric field to the material in a direction parallel to the direction of polarization of the piezo-electric material, that a strain or physical deformation will occur parallel to the direction of the field. The strain will take the form of an extension or a contraction depending upon the relative orientation of the electric field with respect to the direction of polarization. If the field applied by the electrodes 4 and 5 alternates in direction then the portion of the body in the field will alternately expand and contract. Stresses periodically occurring within the central portion of the body 2 produces strains in the adjoining portions of the body 2. If the body 2 is chosen to resonate in the fundamental mode generally described above at the frequency if the applied potential, then the body 2 will be excited to resonate as a unit, with greatly intensified stresses and strains.

Once the body 2 has been driven into a resonant condition of oscillation, effective transducer action occurs. A second property of a piezo-electric material is that upon application if a stress thereto in a direction parallel to the direction of polarization of the piezo-electric material, that a potential appears in a direction parallel to the direction of application of the stress. If the material is alternately stressed in a direction tending to cause alternate compression and extension, the potential appearing will be an alternating potential. Vibration of the piezo-electric body produces such periodic stresses throughout the body and by virtue of the reverse piezo-electric properties just described, a potential appears between the electrodes 6 and 7 situated at the ends of the body.

The theoretical description of transducer action set forth above is confirmed by experiment, and substantial voltages are observed to appear between the electrodes 6 and 7 when alternating potentials of proper frequency are applied between the electrodes 4 and 5. The voltages appearing at the electrodes 6 and 7 are of a substantially greater magnitude than the voltage applied by the source 12 and may be transformed from 5 to 20 times. The output voltage varies considerably with the distance of the electrodes 4 and 5 from the center 10. Positioning of the electrodes tends to change the transformation ratio between the output voltage and the applied voltage, and when the electrodes 4 and 5 are neither close to the center 10 nor close to the outer ends of the body 2, the transformation ratio increases as the electrodes 4 and 5 are brought closer together.

The theoretical development which follows generally supports experiment in predicting the order of the magnitude of the open circuit or lightly loaded transformation ratio of the transformer, and in predicting that the transformation ratio should vary inversely with the distance separating electrodes 4 and 5.

If one applies a static stress P to an elastic material the total elongation $e_{(L)}$ produced will be proportional to the stress P, the length L and inversely proportional to Young's modulus Y:

$$e_{(L)} = \frac{PL}{Y} \quad (1)$$

Likewise, it is known that application of a periodically varying stress having a maximum value $P_m$ will occasion a maximum elongation $e_{m(L/2)}$ at either end of a bar of length L which is proportional to the mechanical Q of the elastic material of the bar when resonance occurs. The expression for maximum elongation $e_{m(L/2)}$ when a longitudinal bar is vibrating at its fundamental mode is as follows:

$$e_{m(L/2)} = \frac{4QP_mL}{\pi^2 Y} \quad (2)$$

If the force is applied over a limited portion of an elongated member resonating at its fundamental mode, the elongation produced is reduced by a factor termed the S factor. Let us assume that the force acts between the points $X_1$ and $X_2$, shown in Fig. 1, and let us designate the appripriate S factor as $S_{12}$. The expression for maximum elongation under the application of periodic potentials over a portion of the longitudinal member then becomes:

$$e_{m(L/2)} = \frac{4QP_mLS_{12}}{\pi^2 Y} \quad (3)$$

In the present arrangement, the stress $P_m$ is excited by an alternating potential. In general, it may be said that the stress occasioned by an electric field is directly proportional to Young's modulus Y, the intensity of the applied electric field, which is equal to the applied voltage $V_i$ divided by the distance $X_2 - X_1$ through which the potential $V_i$ is applied. The stress is further proportional to a fundamental constant of the piezo-electric material generally termed the "$d$" constant. Assigning to the X direction the subscript 1, the "$d$" constant may be designated $d_{11}$, the first subscript denoting the direction of the applied electric field, and the second direction in which the strain component is measured. Expressing the strain in terms of stress and Young's modulus, the maximum stress $P_m$ under the influence of an input potential $V_i$ then becomes:

$$P_m = d_{11}Y\frac{V_i}{X_2 - X_1} \quad (4)$$

Substituting the value for the stress $P_m$ obtained upon application of the potential $V_i$ into the Expression 1, the elongation $e_{m(L/2)}$ now becomes:

$$e_{m(L/2)} = \frac{4Qd_{11}V_iL}{\pi^2(X_2 - X_1)}(S_{12}) \quad (5)$$

The complete expression for $S_{12}$ may be written as follows:

$$S_{12} = \frac{1}{2}\left(\sin\frac{\pi X_2}{L} - \sin\frac{\pi X_1}{L}\right) \quad (6)$$

giving a final expression for maximum elongation:

$$e_{m(L/2)} = \frac{2Qd_{11}V_iL}{\pi^2(X_2 - X_1)}\left(\sin\frac{\pi X_2}{L} - \sin\frac{\pi X_1}{L}\right) \quad (7)$$

Assuming that $X_2$ equals minus $X_1$, the expression simplifies to:

$$e_{m(L/2)} = \frac{2Qd_{11}V_i}{\pi^2}\left(\frac{L}{X_2}\sin\frac{\pi X_2}{L}\right) \quad (8)$$

The Expression 8 indicates the law by which the maximum elongation is related to a given applied voltage having a periodicity equal to the resonant frequency of a resonant bar and applied over a small portion thereof.

The elongation produced by the electric field results in a stressing of the piezo-electric member, and by virtue of the reverse piezo-electric properties of the piezo-electric body, the stresses arising occasion an inverse voltage to be produced in a longitudinal or X direction. The production of the output voltage will now be treated.

If one considers an elemental length $dx$ experiencing an elongation $de_x$, it will be seen that the elemental voltage $dv_o$ produced will be proportional to the elemental elongation $de_x$, Young's modulus Y and "$g$" piezo-electric constant, which in this case is $g_{11}$, since X directions are involved:

$$dv_o = g_{11}Yde_x \quad (9)$$

If the body 2 is assumed to be perfectly elastic and relatively lightly loaded while under the influence of the driving potential $V_i$, the strain and stress distribution will tend to be sinusoidal. The elongation of any particular element is thus proportional to a sine function of the placement of the element times the maximum elongation $e_{m(L/2)}$ occurring at the ends of the body:

$$e = e_{m(L/2)}\sin\frac{\pi X}{L} \quad (10)$$

Consequently, the voltage $dv_o$ developed becomes:

$$dv_o = g_{11}Ye_{m(L/2)}\cos\left(\frac{\pi X}{L}\right)d\left(\frac{\pi X}{L}\right) \quad (11)$$

The total voltage $V_o$ produced is an integral of the elemental voltages $dv_o$. Experiment tends to show that the contribution in output voltage between the electrodes at $X_1$ and $X_2$ may be neglected in most practical arrangements since the electrical impedance of the driving source is frequently such as to reduce the voltage contribution of the driven region. Upon integration of the elemental voltages produced within the region from $$-\frac{L}{2} \text{ to } -X_1$$

and from $$+X_2 \text{ to } +\frac{L}{2}$$

$X_2$ equalling $-X_1$, we obtain the following expression:

$$V_0 = (2e_{m(L/2)})g_{11}Y\left[1 - \sin\frac{\pi X_2}{L}\right] \quad (12)$$

Substituting the value for $e_{m(L/2)}$ obtained in Expression 8, and solving for the transformation ratio $V_0/V_i$, we obtain:

$$\frac{V_0}{V} = \frac{4Qd_{11}g_{11}Y}{\pi^2}\left[\frac{L}{X_2}\sin\frac{\pi X_2}{L}\right]\left[1 - \sin\frac{\pi X_2}{L}\right] \quad (13)$$

Figure 2:
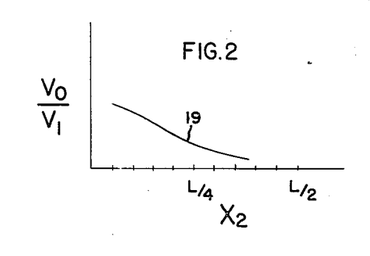
Fig. 2 is a graph illustrating the effect of electrode placement upon the transformation ratio of the piezo-electric transformer illustrated in Fig. 1.

Expression 13 indicates generally the factors influencing the transformation ratio of the configuration of piezo-electric transformer illustrated in Fig. 1, in which the piezo-electric body is continuously polarized and in which the piezo-electric body operates on a fundamental longitudinal mode of vibration under the driving influence of symmetrically placed input electrodes applied at a distance $X_2$ from the longitudinal center of the body. This expression is also applicable to piezo-electric transformers having elongated bodies which are of other regular cross-sections. The voltage transformation is seen to depend on the Q of the material, its direct and inverse piezo-electric constants and Young's modulus. In addition it is seen that the transformation ratio depends on an expression involving the quotient of a sine function and a direct function of the driving electrode coordinate $X_2$. Fig. 2 is a graph of the transformation ratio as a function of the X coordinate of $X_2$, the abscissa being the ratio of $X_2$ to L while the ordinate is the bracketed function:

$$\left[\frac{L}{X_2}\sin\frac{\pi X_2}{L}\right]\left[1 - \sin\frac{\pi X_2}{L}\right] \quad (14)$$

The line 19 of the graph illustrates that under the mathematical treatment so far discussed, the Expression 14 which is a factor in the expression for the transformation ratio, continuously decreases as the dimension $X_2$ is increased. Had a continuous integration been taken, a similarly monotonically decreasing function would have been obtained. It may thus be seen that the transformation ratio is a function of the inner-electrode placement, and that it generally increases as the inner electrodes are placed closer together.

Figure 3:
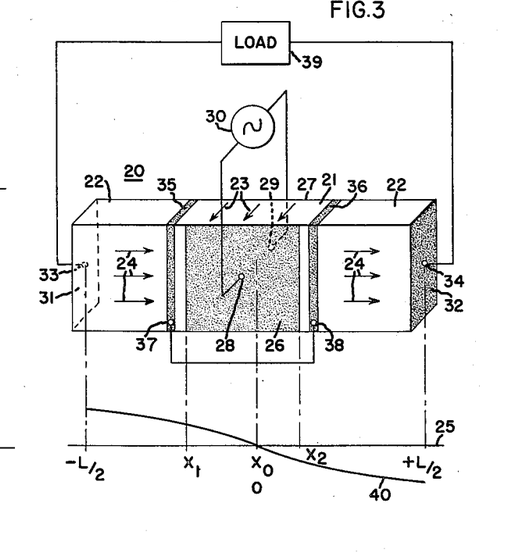
Fig. 3 illustrates a piezo-electric transformer embodying the invention having a thin rectangular piezo-electric body in which a central region is transversely polarized with respect to the outer regions.

Referring now to Fig. 3, a piezo-electric transformer of somewhat different design is shown. At 20 is shown a piezo-electric body of elongated rectangular construction having a cross-section of substantially greater width than thickness. The body 20 is provided with two regions 21 and 22 of dissimilar polarization. Arrows 23 indicate the direction of polarization of the first region 21 to be in a direction perpendicular to the long dimension of the body 20 and in the direction of the smallest dimension. Arrows 24 indicate the direction of polarization of the region 22 to be in a longitudinal direction. For convenience in describing the placement of the electrodes and the relative dimensions of the body 20, a rectangular co-ordinate axis 25 is established below the body 20, and points along the longitudinal axis of the body 20 are projected thereon. The centerline of the body 20 is assigned a value $X_0$ equal to zero, while the left end of the body 20 is assigned a coordinate $$-\frac{L}{2}$$

and the right end a coordinate $$+\frac{L}{2}$$

L being the length of the body 20. The central region 21 of the body 20 extends a direction $X_1$ to the left of the center of the body 20 and a direction $X_2$ to the right of the center $X_0$. These distances are projected upon the line 25. Substantially co-extensive with the central region 21 is a first pair of electrodes 26 and 27 applied respectively to the wide faces of the body 20, in the drawing being the front and back faces of the body 20. These electrodes are provided with junctions 28 and 29 respectively, to which a source of alternating potentials 30 is connected. Output electrodes are shown at 31 and 32 applied respectively to the ends of the body 20 shown to the left and right in the drawing. Junctions for these electrodes are shown respectively at 33 and 34. Two additional electrodes 35 and 36 are applied to the surface of the body 20 encircling the body in a narrow band near the inner edges of the region 22, in the drawing shown to the left and right of the center respectively. These electrodes are provided respectively with junctions 37 and 38, which may be electrically connected together. A load device 39 has its terminals connected respectively to the junctions 33 and 34.

The arrangement in Fig. 3 is capable of considerably greater transformation ratios than the apparatus generally shown in Fig. 1, in some arrangements being as great as 100. The transformation ratio has been experimentally ascertained to depend upon the ratio of the total length to the thickness of the body 20 and it has also been determined experimentally that the optimum width of the driving region 21 should be approximately ⅓ the total length of the body 20.

In describing the operation of Fig. 3 it should be noted that the source 30 applies a field to the electrodes 26 and 27 at the junctions 28 and 29, the voltage producing a field transverse to the longitudinal axis of the body 20. The direction of the field is parallel to the direction 23 of polarization of the central region 21 of the body. Application of an alternating potential between 28 and 29 consequently brings about an alteration in the thickness dimension of the body 20. This strain, by virtue of Poisson's coupling within the material also produces a strain in the longitudinal dimension of the body 20, and by the method explained in detail with regard to the embodiment of Fig. 1 produces longitudinal mechanical vibration of the body 20. The vibration of the body 20 is accompanied by strains along the longitudinal axis, and if the body 20 is chosen to resonate with an anti-node at either end in the fundamental mode at a frequency equal to the frequency of the applied potentials, then a periodic potential appears between the electrodes 31 and 32 applied to the body 20. The electrode junctions furnish these potentials to the high impedance load device 39.

The curve 40 illustrates the relative excursions in the longitudinal or X direction of various points along the longitudinal axis of the body 20 when the transformer operates at a fundamental mode under light loading. Both portions of the curve 40 are approximately sinusoidal.

Employing a mathematical solution similar to that applied to the embodiment of Fig. 1, the transformation ratio of the embodiment shown in Fig. 3 may be found to be:

$$\frac{V_0}{V_i} = \frac{8Q}{\pi^2}d_{31}g_{11}Y\left[\frac{L}{T}\sin\frac{\pi X_2}{L}\right]\left[1 - \sin\frac{\pi X_2}{L}\right] \quad (15)$$

where $d_{31}$ is the direct piezo-electric coefficient for an electric field applied in the direction parallel to the polarization arrows 23 causing a strain in the longitudinal or X direction, $g_{11}$ is the inverse piezo-electric coefficient corresponding to a mechanical stress applied and an electric field produced in the X direction, L is the total length of the body 20, T is the thickness of the body 20, and $X_2$ is the coordinate of the right boundary of the region 21, the region 21 being centrally disposed along the X axis.

An inspection of Expression 15 shows that the transversely polarized embodiment possesses a voltage transformation which is directly proportional to the ratio of the length to the thickness and that the transformation ratio is further affected by the width of the driving region in the following manner:

$$\left[\frac{L}{T}\sin\frac{\pi X_2}{L}\right]\left[1-\sin\frac{\pi X_2}{L}\right] \quad (16)$$

Figure 4:
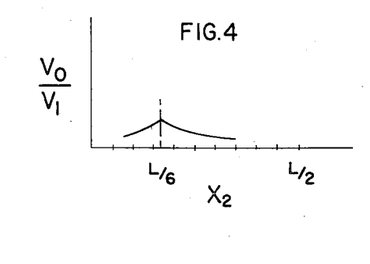
Fig. 4 is a graph illustrating the effect of the width of the central region of transverse polarization upon the transformation ratio.

Fig. 4 illustrates the effect which varying widths of the driving region have on the transformation ratio, the abscissa being the coordinate of boundary of the central region 21 and the ordinate being the evaluation for the Expression 16. It will be seen that the Expression 16 attains a maximum value at a value of $$X_2 \text{ equalling } \frac{L}{6}$$

a conclusion which is borne out by experiment. In two constructions of the embodiment shown in Fig. 3, one embodiment having a central region of approximately one tenth the length was found to give an open circuit transformation ratio of 10 while a similar embodiment in which the central region was approximately one third of the length was found to give an open circuit transformation ratio of 14.5, the maximum value attained by adjusting solely the ratio of "$X_2$" of the central region to the length "L."

It may thus be seen that in both the configurations of Figs. 1 and 3, that a voltage transformation is achieved which is dependent upon electrode placement. Theoretically derived Expressions 14 and 16 generally indicate that the voltage transformation is dependent upon the product of three factors $$\left[\sin\left(\frac{\pi X_2}{L}\right)\right], \left[1-\sin\left(\frac{\pi X_2}{L}\right)\right]$$

each never exceeding unit, and a first factor $L/X_2$ or $L/T$, which may reach large values. This first factor indicates the upper limit of transformation in a step-up transformer if the factor $X_2$ or $T$ is varied. As may be observed, the Expression 14 cannot exceed $\pi$ while the Expression 16 can increase without limit mathematically, although, practically, other factors enter, such as breakdown potentials, non-linearity of parameters at high fields and stresses and so forth. Experiments bear out these mathematical conclusions to the extent that the transversally polarized embodiments are characterized by considerably higher transformation ratios than continuously polarized embodiments.

The ratio $L/X_2$ or $L/T$ which affects the maximum transformation ratio, in accordance with the invention, is properly chosen for the attainment of high transformation ratios. This ratio in each of the embodiments defines the ratio of the distance between the input electrodes and the output electrodes. It should be noted however that the mode of resonance employed in each of the embodiments establishes maximum vibrational excursions in a longitudinal direction between the ends of the vibrating body. The output electrodes are placed to collect voltages arising along this line between points where maximum elongations and hence maximum voltages would be developed; either between both ends of the body or between one end and the center. The input electrodes, on the other hand, if they are oriented to apply an electric field in the longitudinal direction, are placed to span a portion of the body experiencing a smaller overall physical excursion and hence span a region of a lower intrinsic voltage level if one considers the reverse piezo-electric effects. If the electrodes are oriented to apply an electric field in a transverse direction, they are also placed to span a portion of the body experiencing a smaller overall physical excursion and hence span a region of lower intrinsic voltage level.

The significant factor determining electrode placement is that the electrodes be appropriately oriented with respect to the natural patterns of vibration which occur within the body. The requirement for electrode placement may be stated in several general ways. A simple statement of the rule would be that the output electrodes should be placed to span a portion of the vibration pattern experiencing a different mechanical excursion than the input electrodes. For maximum step-up transformations, the electrodes would be placed as required by Expressions 14 and 16. Since the stress pattern existing in the body is accompanied by an electric field pattern, the rule of electrode placement may be stated in terms of the electric field pattern. In electrical terms, the input and output electrodes should be oriented with respect to the electric field pattern such that the total integrated potential arising between the input and output electrodes is dissimilar.

Another statement of the rule would be in terms of impedances at the regions of electrode placement. It is well known that a lever is a transformer of mechanical impedances, its property being to convert a large force acting at a small velocity to a small force acting at a large velocity, or vice versa. Since the different regions between the input and output electrodes experience different relative velocities, these electrodes may be said to be coupled through a lever or a mechanical transformer, and as in any transformer, they may be said to be coupled at differing impedance levels, a statement which is true both electrically and mechanically.

The piezo-electric body material employed in Figs. 1 and 3 is an aggregate of polycrystalline ferroelectric ceramic material principally composed of barium titanate and admixed with small quantities of materials which are used to control the physical characteristics of the material. The term "piezo-electric," in accordance with current usage has been applied to materials including both naturally piezo-electric materials and materials which become piezo-electric by suitable processing, and which are now called ferro-electrics. It should be noted that other materials having high "Q's" and high "DGY-products" could also be employed to advantage. Ferro-electric materials possess the advantage of permitting polarizations after the piezo-electric body has been formed. This permits advantageous local orientations of polarization in unitary piezo-electric bodies.

Referring now to Fig. 5, there is shown an electromechanical transducer comprising a piece of piezo-electric material, indicated generally at 41, substantially in the shape of a rectangular parallelopiped, and having a driving region 42 and a driven region 43. While a rectangular prism has been selected for illustrative purposes, the principles of the invention are equally applicable to piezo-electric materials of other geometries, such as for example, hollow tubing which has been properly polarized with regard to the electric field directions of the driving and driven regions respectively. This will become more evident as the discussion proceeds. The driving and driven regions may be formed separately, and then fastened together by a suitable cement such as one of the epoxy resins; however, it is preferable that they be made from a single piece of piezo-electric material as illustrated in Fig. 5. The opposite faces 44 of the driving region 42 are covered with a metallic coating such as silver for example, to provide a pair of input terminals, one of which is connected to ground at 45. In like manner, the end 46 of the driven region 43 remote from the driven region is similarly coated with silver to provide an output terminal for the transducer, the other output terminal being the common ground at 45. The device is energized by a source of alternating current as shown at 47.

The piezo-electric material chosen to illustrate the principles of the transducer shown in Fig. 1 and in the other embodiments illustrated, is a polycrystalline piezo-electric ceramic such as barium titanate which has been made piezo-electric by applying a high electrical polarizing field as the ceramic is cooled down through its Curie temperature. For barium titanate (BaTiO₃), the Curie temperature is about 120° centrigrade. Other materials such as niobates (colombates) for example may also be successfully utilized. At this point it should be understood that the invention is applicable to materials which are either naturally piezo-electric or which can be made so by proper processing.

As will be seen from a study of Fig. 5, the driving region 42, is prepolarized in the transverse or Z-axis direction as indicated by the arrows at 48, while the driven region is prepolarized in the longitudinal or X-axis direction as shown by the arrows at 49. The material so prepared possesses the well known pressure-electrical reversible effects shared by certain other materials known as piezo-electrics.

In the operation of the transducer disclosed in Fig. 5, an alternating current from source 47 is applied to the driving region 42 and an amplified voltage output is delivered at the output end. Thus it will be seen that the device functions as a step-up transformer. However, if a stepdown voltage ratio or step-up current ratio is desired, all that needs be done is to interchange the input and output ends from the respective positions shown in Fig. 5. Thus region 43 now becomes the driving area and region 42 the driven region.

In each embodiment, step-up voltage transformer action is illustrated; but by electrically reversing the input and output leads, the step-down voltage transformer action may be obtained. Before proceeding with a detailed description of the devices shown in Figs. 6 and 7, an explanation will be given concerning the theoretical considerations underlying the transformer phenomena exhibited by all these embodiments.

The piezo-electric material utilized in the transformer has a natural or mechanical frequency which is a function of the velocity of sound in the material and of the wavelength measured in the direction of the propagation of the sound. Expressed mathematically:

$$f = \frac{c}{\lambda}$$

where:

$f$ = the natural frequency in cycles per second
$c$ = velocity of sound in the medium in cycles per second per unit distance
$\lambda$ = wavelength measured in the direction of wave propagation In order to obtain maximum output voltage in Fig. 5, the driver and driven element lengths should be in a 1:1 ratio, with the overall length L, measured in the direction in which the output is to be derived, adjusted to establish a half wavelength at the driven or natural frequency.

The devices shown in Figs. 1, 3, 5 and 6 are driven at the fundamental mode of resonance, with the length $$L = \frac{\lambda}{2}$$

In the transformer which will shortly be described in connection with Fig. 7, the piezo-electric member is fixed at one end and fundamental resonance occurs at $$L = \frac{\lambda}{4}$$

A second condition for voltage output requires that electrical frequency of the applied alternating current be made equal to the natural or mechanical frequency of the material. Stated differently, the frequency of the source is that which is required to make the over-all length L equal to one-half the acoustical wavelength at the natural or acoustical frequency of the barium titanate.

When the transformer is energized, the alternating voltage applied causes mechanical resonance of the barium titanate. The compressional wave initiated by the electrical field travels back and forth between the input electrodes of the barium titanate, reinforced at the completion of each cycle of travel by an in-phase recurrence of the electrical field that set it in motion. At resonance the amplitude of the mechanical vibrations is considerably increased.

At frequencies below resonance the most notable dimensional change takes place in the Z-direction, but because of mechanical coupling, simultaneous compression and expansion is also experienced in the X- and Y-directions. However, in the embodiment shown in Fig. 5, only the deformation in the X direction is utilized to obtain the output voltage. Strong lengthwise (X-axis) mechanical resonance occurs, and the driven region 43 has induced in it, standing wave patterns of stress, strain and displacement. Maximum stress and strain take place at the center of the piece, while maximum displacement takes place at the respective ends thereof. By the reverse piezo-electric effect (i.e. mechanical to electrical) the resulting internal stress produces a separation of charges throughout the length of the material, the cumulative effect resulting in a large over-all amplification. The output voltage is proportional to the maximum displacement at the end, which in turn is proportional to the ratio of the length L to the thickness T, and to the over-all Q of the piece.

Figure 6:
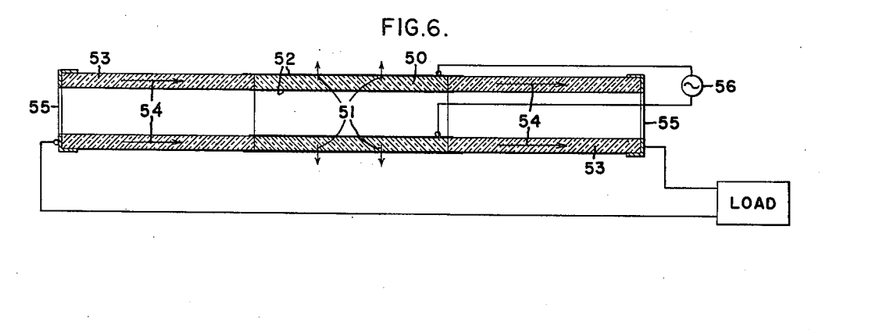
Fig. 6 illustrates a piezo-electric transformer employing a tubular body in which the central region is radially polarized.

Another embodiment of the invention is shown in Fig. 6. Essentially, this transformer consists of a hollow tube of ceramic material, for example, barium titanate, suitably prepolarized as will be presently explained. The transformer may be made from a single piece of tubing, or if more convenient, it may be fabricated from three similar sections suitably joined together by cementing means. The driver element 50 is polarized radially as shown by the arrows 51. The inner and outer surfaces of the driving element 50 are covered with a metallic coating 52 such as silver or the like. The driven elements 53 are fixedly secured to the ends of the driver element, as by cementing; each of the driven elements 53 is prepolarized axially as shown by the arrows at 54. The outer or free ends of driven elements 53 are each provided with metallic rings 55 which constitute the output electrodes for the transformer. A source of potentials is shown at 56 having its terminal connected to the inner and outer metallic coatings 52. As stated previously in connection with the foregoing embodiment, the over-all length L is a half-wave length at the natural frequency of the entire ceramic tubing. For maximum voltage output, the length of the driving element is in the ratio of 1:3 with respect to the over-all length of the transformer.

The operation of the transformer is very similar to that described in connection with the Fig. 5 embodiment. The element 42 acts as an electro-mechanical driver so that compression and expansion in the axial direction, by virtue of the mechanical coupling by the driver and the driven elements, is transferred to the output ends which develop a high voltage when the entire tubing is driven at the resonant frequency.

Figure 7:
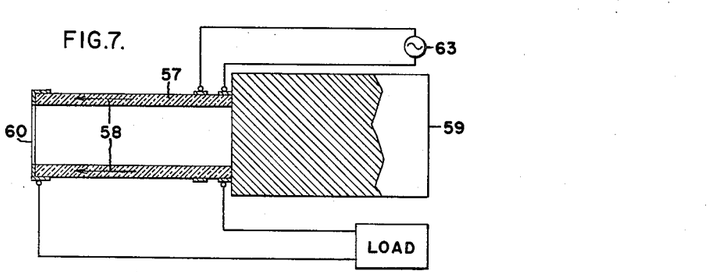
Fig. 7 illustrates a piezo-electric transformer employing tubular piezo-electric body of continuous polarization, the length of the piezo-electric member being chosen to be of approximately one quarter wave length.

Another variation of the invention is shown in the transformer depicted in Fig. 7. A hollow piece of ceramic material 57 is prepolarized axially in the direction indicated at 58. At one end of the tubing, there is a metallic support or mass 59. In order to insure optimum performance, the material selected for the support 59 should have a low mechanical loss. In addition, the material selected should have an impedance $\rho C$, much larger than that of the barium titanate so that almost total reflection occurs at the junction of the barium titanate and the mass 59 where:

$\rho$ = the density of the material
$C$ = the velocity of sound in the material Alternately, a material of low mechanical loss may be chosen which is λ/4 long acoustically making the overall length of the transducer λ/2 acoustically.

The outer or open end of the tubing is provided with a metallic ring 60 which serves as one output terminal for the device. The transformer is driven through a pair of metallic rings 61, 62 positioned on the outer circumference of the tubing and coupled to the source 63. The ring 62 serves as the other output terminal for the device.

Figure 8:
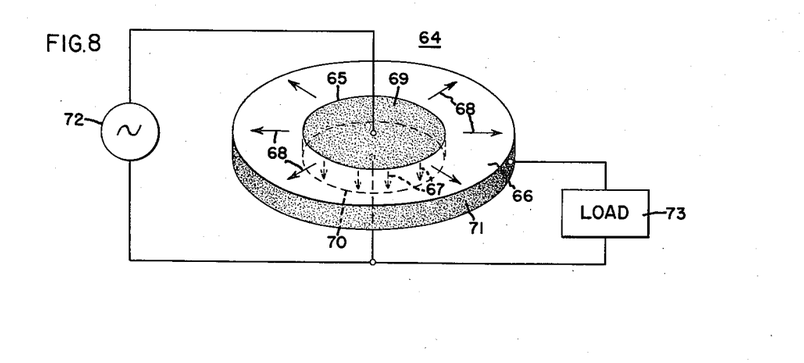
Fig. 8 shows a piezo-electric transformer employing a piezo-electric body of disk shape having a central region which is transversely polarized with respect to the outer region.

Referring now to Fig. 8 there is shown a further embodiment of the present invention. A thin disc of piezo-electric material is shown at 64 having a central region 65 of a cylindrical shape which is polarized in a plane perpendicular to the axis of the disc, and an annular region 66 surrounding the central region 65, in which the piezo-electric material is polarized in an axial direction. Arrows 67 indicate the direction of polarization of the central region 65 while the arrows 68 indicate the direction of polarization of the annular region 66. A disc shaped electrode 69 is applied to the upper surface of the transformer 64, having a diameter equal to the diameter of the central region 65. Opposing the electrode 69 is a second electrode 70 of equal diameter applied to the under surface of the disc. A third electrode 71 is applied to the peripheral edge of the disc. A source of alternating current potentials is shown at 72 having its terminals connected respectively to electrode 69 and electrode 70. A load device 73 is shown coupled between electrode 71 and electrode 70.

The arrangement of Fig. 8 operates on a radial mode of vibration, employing a driving region transversely polarized with respect to the output region to achieve a substantial voltage step-up. Application of alternating current potentials from the source 72 to the electrodes 69 and 70 creates an electrical field in the central region 65 of the transformer in a direction parallel to the direction of polarization shown by the arrows 67. The application of these potentials, by virtue of the piezo-electric properties of the body, causes a variation in the thickness dimension of the central portion 65, and by virtue of Poisson coupling, occasions a corresponding extension of the central region 65 in a radial direction. The radial extensions and contractions of the central region 65 are then transmitted to the annular region 66 thereby tending to cause this region to expand and contract in a generally radial manner. The physical dimensions of the transformer 64 are chosen so that the body tends to be resonant at the desired frequency of operation. Since the annular region is polarized in a radial direction, a radial extension of the annular region 66 causes periodic radial strains in the workpiece, and the resultant radially developed voltage to be derived by the electrodes 71 and 70.

In a device constructed in the manner illustrated in Fig. 8, in which the diameter of the piezo-electric body was one inch, the diameter of the hub region was approximately half an inch, and the thickness was approximately 3/32 of an inch, a resonant frequency of 331 kilocycles was obtained. Operating in an unloaded condition, a maximum voltage gain of 25 was obtained.

Figure 9:
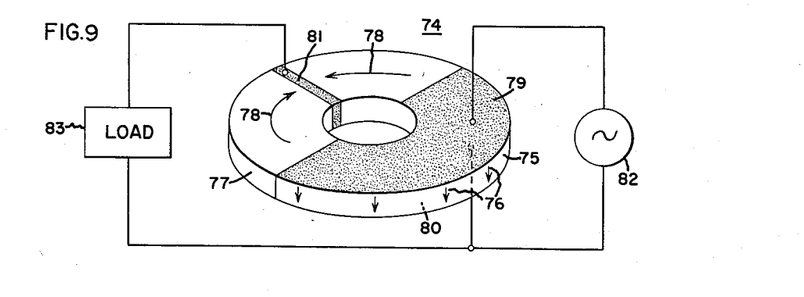
Fig. 9 illustrates a piezo-electric transformer in which a ring shaped piezo-electric body is employed having regions which are transversely polarized with respect to one another.

Another embodiment of the invention is illustrated in Fig. 9. In Fig. 9 the piezo-electric body 74 is of annular configuration, being divided into two approximately semi-circular regions. In the driving region 75, the body is polarized in a direction parallel to the axis of the annulus, the arrows 76 indicating the direction of polarization. In the output region 77, the body 74 is polarized in opposing tangential directions, the arrows 78 indicating the directions of polarization. Input electrodes 79 and 80 are applied respectively to the upper and lower surfaces of the region 75. An output electrode cooperating with the region 77 is shown at 81. The electrode 81 is applied to the surface of the workpiece 74, opposite to the input electrodes, and forms a loop extending about a branch of the annulus which lies in a plane perpendicular to the surface of the annular body 74. A source 82 is coupled between the electrodes 79 and 80, a load device 83 is coupled between the electrodes 81 and 80.

The arrangement of Fig. 9 operates in what might be termed a tangential mode of vibration, the application of potentials to the input electrodes 79 and 80 occasioning, by virtue of Poisson coupling, an increase in the average radius of the body 74 and concommittent therewith a change in the circumference and radius of the annulus. The variation in circumference of the body 74 in the driving region 75 occasions similar stresses and resultant strains in the output region 77. The electrodes 81 and 80 then develop a voltage in the presence of the tangential components of these strains.

Figure 10:
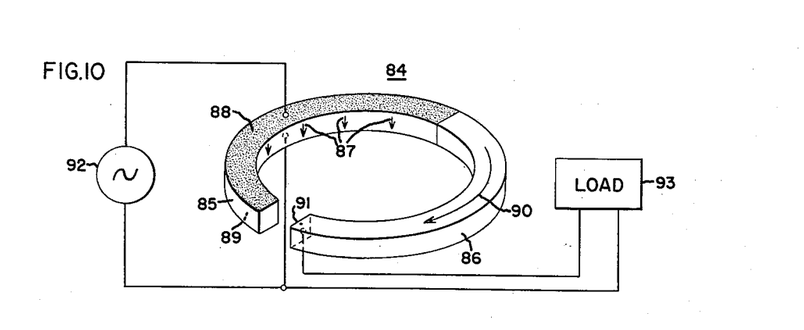
Fig. 10 illustrates another piezo-electric transformer in which an incomplete ring shaped piezo-electric body is employed, the body having two regions which are transversely polarized with respect to one another.

Fig. 10 illustrates an embodiment in which somewhat lower frequency operation can be obtained for a given size piezo-electric body. The body 84 is of a broken ring configuration, divided approximately evenly into a semi-circular driving region 85 and a semi-circular output region 86. In the driving region 85, the piezo-electric body is polarized in a plane perpendicular to the upper surface of the washer as indicated by the arrows 87. Electrodes 88 and 89 are applied upon the upper and lower surface of the workpiece 84, co-extensive with the region 85 of vertical polarization. The region 86 is polarized in a circumferential direction indicated generally by the arrow 90. A third electrode 91 is applied to the surface of the region 86 abutting the gap. A source 92 of alternating current potentials is then coupled to the electrodes 88 and 89, while a load device 93 is coupled between the electrodes 88 and 89.

A device constructed with a configuration shown in Fig. 10 was found to have a principal resonant frequency of 57 kilocycles, at which frequency a maximum voltage transformation of 8 was achieved. The body 84 had an outer diameter of approximately 1⅜ inches, an inner diameter of 1⅛ inches, and a gap of one half inch. A cross section of a branch of the washer was approximately ⅛" by ⅛".

In many of the embodiments the device has been illustrated as an auto-transformer, the driven element constituting the primary, while the output is the secondary. However, it should be made clear that in these cases full transformer action is possible by the use of suitably positioned auxiliary electrodes.

While certain specific embodiments have been shown and described, it will, of course, be understood that various other modifications may yet be devised by those skilled in the art which will embody the principles of the invention and found in the true spirit and scope thereof.

What I claim as new and desire to secure by Letters Patent of the United States is:

1. In an electrical energy transfer device having a substantial transformation ratio, a piezo-electric body having a resonant mode at a predetermined frequency, first electrode means for impressing a periodic field over a predetermined region of said body, the period of said field corresponding substantially to said frequency so as to cause resonance of said body accompanied by a field throughout the resonant region, and second electrode means for abstracting energy from said body applied to a second region of said body embracing an integral of electric gradient different from the integral of electric gradient embraced by said first electrode means.

2. In an electric energy transfer device having a substantial transformation ratio, a piezo-electric body having a resonant mode at a predetermined frequency, driving electrode means associated with said body at a region characterized by a first driving impedance at said frequency and piezo-electrically coupled to said region, and take-off electrode means associated with said body at a region characterized by a passive impedance at said frequency different from said driving impedance and piezo-electrically coupled to said latter region.

3. In an electrical energy transfer device having a substantial transformation ratio, a piezo-electric body having a resonant mode at a predetermined frequency, electrode means for developing a period electric field in a predetermined region of said body piezo-electrically coupled to said predetermined region, whereby said body is caused to vibrate mechanically with an amplitude varying from region to region of said body, and output electrode means piezo-electrically coupled to said predetermined region of said body, said region being characterized when said body is vibrating in said mode by a mechanical vibration amplitude different from the mechanical vibration amplitude in the region subjected to the driving electric field.

4. In an electrical energy transfer device having a substantial transformation ratio, a body of piezo-electric material having a resonant mode of vibration at a predetermined frequency, input electrode means applied to a portion of said body and piezo-electrically coupled thereto adapted to establish a resonant vibration pattern in said body when energized by potentials of said predetermined frequency, and output electrode means applied to said body piezo-electrically coupled to a region of said body lying within a portion of said resonant vibration pattern experiencing a different periodic extension from the portion across which said input electrode means are coupled.

5. In an electrical energy transfer device having a substantial transformation ratio, a body of piezo-electric material having a resonant mode of vibration at a predetermined frequency, first electrode means applied to said body and piezo-electrically coupled to a region of said body, said electrode means being adapted to establish a resonant vibration pattern in said body when energized by potentials of said predetermined frequency, and second electrode means applied to said body piezo-electrically coupled to a second region thereof along a line in said vibration pattern experiencing a different periodic extension from the line along which said first electrode means are coupled.

6. In an electrical energy transfer device having a substantial transformation ratio, a body of piezo-electric material having a resonant mode of vibration at a predetermined frequency, input electrode means piezo-electrically coupled to said body along an axis of polarization thereof and adapted to establish a resonant vibration pattern in said body when energized by potentials of said predetermined frequency and output electrode means piezo-electrically coupled to said body along an axis of polarization thereof and adapted to derive output potentials accompanying said vibration pattern, said input and output electrodes spanning respective dimensions of said vibration pattern experiencing different relative maximum extensions.

7. In an electrical energy transfer device, a body of piezo-electric material polarized for substantially the length of its major axis and adapted to resonate at a predetermined frequency in a mode of vibration along said major axis with anti-nodal regions at both ends, first electrode means applied respectively in the anti-nodal regions at both of said ends and second electrode means applied at equal distances from the center of said body measured along said major axis, both said electrode means acting in a direction parallel to said major axis, one of said electrode means being adapted to excite said body to resonance along said major axis under the influence of applied potentials of said predetermined frequency and the other of said electrode means being adapted to derive output potentials from the vibrations resulting therefrom.

8. In the combination according to claim 7, wherein said body is of tubular shape.

9. In an electrical energy transfer device, a body of piezo-electric material polarized for substantially the length of its major axis and adapted to resonate at a predetermined frequency in a mode of vibration along said major axis with an anti-nodal region at one end and a nodal region at the other end, and three electrodes applied to said body respectively in the anti-nodal region at said anti-nodal end, at said nodal end, and at an intermediate position measured along said major axis, two of said electrodes being adapted to excite said body to resonance along said major axis under the influence of applied potentials of said predetermined frequency and two of said electrodes being adapted to derive output potentials from the vibrations arising in said body.

10. In the combination according to claim 9, wherein the electrode common to said first two and said second two electrodes is said electrode applied at said nodal region.

11. In an electrical energy transfer device, an elongated body of piezoelectric material polarized for substantially the length of said body along its major axis and adapted to resonate mechanically at a predetermined frequency in a longitudinal mode with a nodal region in one portion of said body and an anti-nodal region in another portion of said body adjacent said one portion, first electrode means piezoelectrically coupled along said axis of polarization to said one portion, second electrode means piezoelectrically coupled along said axis of polarization to a region embracing at least said other portion, one of said electrode means being adapted to excite said body to mechanical resonance under the influence of applied potentials of said predetermined frequency, and the other of said electrode means being adapted to derive output potentials from the mechanical vibrations resulting therefrom.

12. The arrangement set forth in claim 11 wherein said body is of an artificially piezoelectrical material.

13. The arrangement set forth in claim 11 wherein said second electrode means embraces substantially the total length of said body.

14. In an electrical energy transfer device exhibiting a substantial transformation ratio, a piezoelectric body having predetermined polarization adapted to mechanically resonate at a predetermined frequency with a nodal region in one portion of said body and at least one anti-nodal region in another portion of said body, adjacent said one portion, first electrode means piezoelectrically coupled in the direction of polarization to said one portion, second electrode means piezoelectrically coupled in the direction of polarization to said second portion, one of said electrode means being adapted to excite said body to mechanical resonance under the influence of applied potentials of said predetermined frequency and the other of said electrode means being adapted to derive output potentials from the mechanical vibrations resulting therefrom.

15. The arrangement set forth in claim 14 wherein said body is of an artificially piezoelectric material.

16. In an electrical energy transfer device having a substantial transformation ratio, a piezoelectric body of predetermined polarization and simple geometrical configuration having a resonant mode of mechanical vibration at a predetermined frequency characterized by nodal and anti-nodal regions, first electrode means for impressing a periodic field over a portion of said body, said field being applied in the direction of polarization to said portion and the period of said field corresponding substantially to said frequency so as to cause mechanical resonance throughout said body accompanied by an electrical field, and second electrode means coupled in the direction of polarization to a second portion of said body, one of said portions of said body embraced by electrode means being generally restricted to a nodal region of the mechanical vibration and the other said portion of said body embraced by electrode means including at least an anti-nodal region of said mechanical vibration and extending to said nodal region.

17. In an electrical energy transfer device having a substantial transformation ratio, a piezoelectric body of predetermined polarization and simple configuration having a resonant mode of mechanical vibration at a predetermined frequency, first electrode means embracing said body for impressing a periodic electrical field over a portion of said body, said field being applied in the direction of polarization to said portion and the period of said field corresponding substantially to said frequency so as to cause mechanical resonance throughout said body accompanied by an electrical field, and second electrode means embracing said body for deriving an electric output potential coupled in the direction of polarization to a second portion of said body, said second electrode means embracing a portion of said body characterized by a substantially different periodic extension measured in the direction of polarization thereof when said body is in mechanical resonance in said mode than the portion which said first electrode means embrace.

18. In an electrical energy transfer device having a substantial transformation ratio, a piezoelectric body of predetermined polarization having a resonant mode of mechanical vibration at a predetermined frequency characterized by nodal and anti-nodal regions, first electrode means for impressing a periodic electrical field over a portion of said body, said field being applied in the direction of polarization to said portion and the period of said field corresponding substantially to said frequency so as to cause mechanical resonance throughout said body accompanied by an electrical field, and second electrode means coupled in the direction of polarization to a second portion of said body, one portion embraced by one of said electrode means being largely in said nodal region, and the other portion embraced by the other of said electrode means including at least an anti-nodal region and extending to said nodal region.

19. In an electrical energy transfer device having a substantial transformation ratio, a piezoelectric body having a resonant mode of mechanical vibration at a predetermined frequency, first electrode means for developing a periodic electric field in a portion of said body along the axis of polarization of said portion so as to cause mechanical vibrations throughout said body, and second electrode means applied to a second portion of said body along the axis of polarization of said second portion for abstracting energy from said body, said second electrode means embracing an integral of electric gradient, when said body is vibrating in said mode, different from the integral of electric gradient embraced by said first electrode means.

References Cited in the file of this patent

UNITED STATES PATENTS

| | | |
|---|---|---|
| 2,803,803 | Jonker | Aug. 20, 1957 |
| 2,830,274 | Rosen | Apr. 8, 1958 |
| 2,886,787 | Broadhead | May 12, 1959 |